United States Patent [19]

Altabé

[11] 4,206,940
[45] Jun. 10, 1980

[54] HANDLING HOOK ASSEMBLY

[76] Inventor: Edmond Altabé, 167 Avenue Gambetta, Paris, France 75020

[21] Appl. No.: 908,700

[22] Filed: May 23, 1978

[30] Foreign Application Priority Data

Nov. 24, 1977 [FR] France .................... 77 35304

[51] Int. Cl.² .................................... B66C 1/36
[52] U.S. Cl. .................................... 294/82 R; 24/241 P
[58] Field of Search .............. 294/82 R, 78 R, 83 R; 24/241 P, 241 R, 241 PP, 241 TC, 241 SL, 230.5, 232, 238, 242, 231

[56] References Cited

U.S. PATENT DOCUMENTS

| | | | |
|---|---|---|---|
| 1,118,618 | 11/1914 | Babb | 24/241 P |
| 2,436,792 | 3/1948 | Dahlander | 24/241 P |
| 2,462,965 | 3/1949 | Henderson | 24/241 P |
| 3,785,015 | 1/1974 | Dorton | 294/82 R |
| 3,827,746 | 8/1974 | Byers | 294/82 R |
| 3,940,173 | 2/1976 | Ulbing | 294/82 R |

Primary Examiner—James B. Marbert
Attorney, Agent, or Firm—Hubbell, Cohen, Stiefel & Gross

[57] ABSTRACT

The invention is related to a handling hook assembly comprising a hook member having a long arm connected to a short arm by a curved hook member portion. The respective free ends of said arms are located at a distance from each other, so as to define between them a gap through which a carrying sling, or the like, can be introduced into said hook member. A locking lever is pivotally mounted onto said hook member at a location near the free end of the long arm, which locking lever is angularly displaceable between an open position wherein the locking lever clears the gap, and a locking position wherein the locking lever closes said gap. Hooking means are provided on the locking lever and at said free end of the short arm for positive locking engagement between said lever and said free end of the short arm when said lever is in said locking position. The lever is provided with an aperture adapted to receive a raising cable actuated by a hoisting apparatus, said aperture being so located that when the handling hook assembly depends from the cable with the curved hook member portion directed downwardly, the above-mentioned aperture is placed at a level above the pivoting axis of the locking lever and the pivoting axis is located at a level above the lowermost zone of said curved hook member portion, the respective locations of said aperture, pivoting axis and lowermost zone of the curved portion being such that under the effect of a downwardly directed force acting on the lowermost zone of the curved portion of the depending hook assembly, the locking lever is forced into said locking position.

8 Claims, 6 Drawing Figures

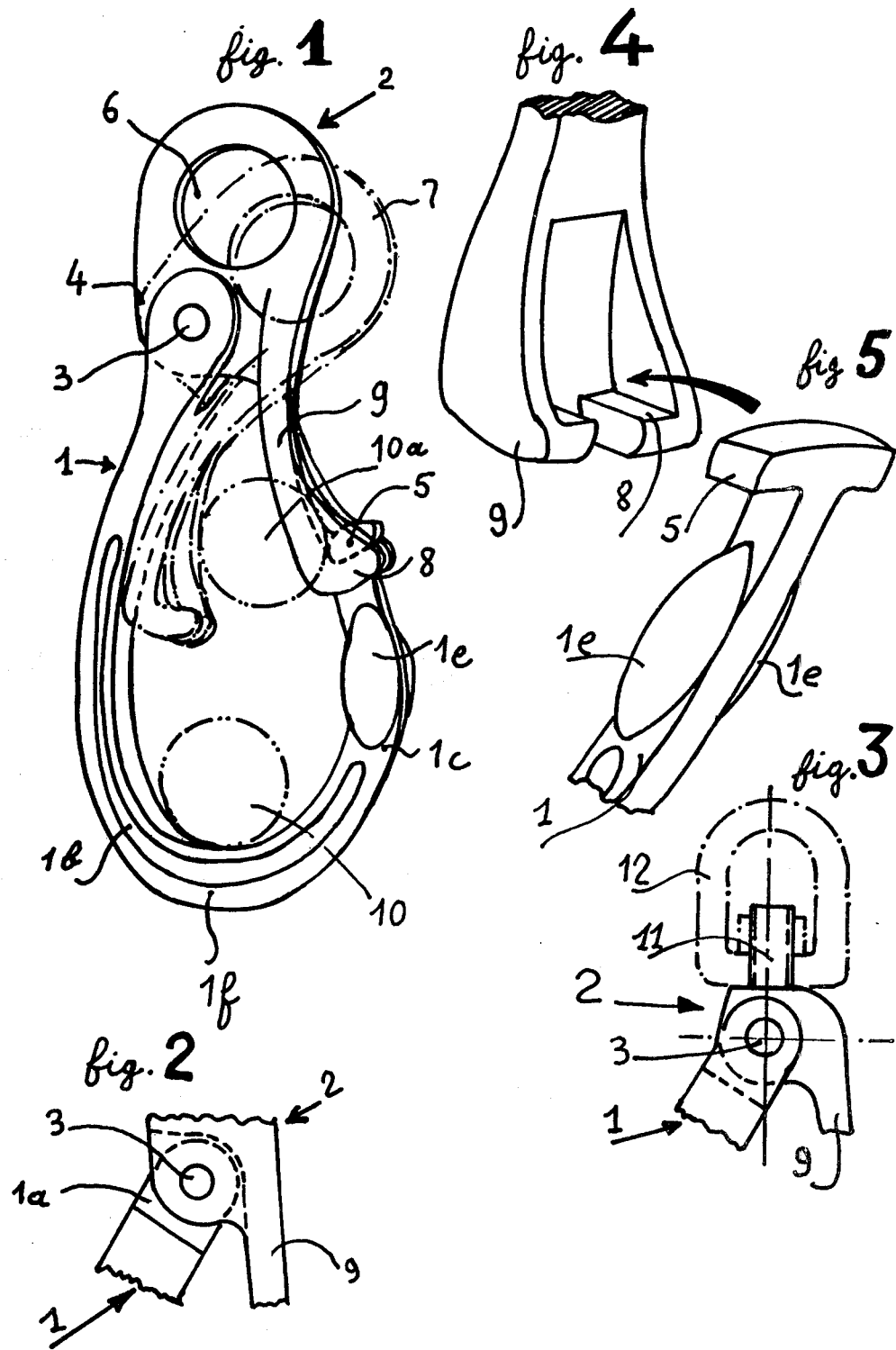

HANDLING HOOK ASSEMBLY

BACKGROUND OF THE INVENTION

The present invention is related to a handling hook assembly adapted to be suspended from the raising cable of a hoisting apparatus and to carry a sling, or the like, which in turn carries a load to be raised or lifted.

STATEMENT OF THE PRIOR ART

Known hook assemblies of this kind comprise a hook member adapted to receive the load carrying sling which can be introduced into or removed from the loop defined by the hook member through a gap provided between one end of the hook member and an opposed portion thereof; in the known type of handling hook assemblies considered herein, this gap can be closed or bridged over by means of a spring-loaded pawl or catch which is mounted and arranged in such a way that under the action of the associated spring the pawl is biassed toward a position wherein it closes the above-mentioned gap so as to prevent a carrying sling which has previsously been introduced into the hook member from accidentally escaping therefrom. When it is desired to introduce such sling into this known hook assembly, and especially when it is desired to remove this sling from the hook assembly, e.g. after the achievement of a load handling operation, it is necessary for the operator to act manually on the pawl with a view to bringing the same into its open position, thus clearing the above-mentioned gap of the hook member.

This known device has a certain number of considerable drawbacks: for instance, the spring acting on the pawl cannot be practically realized so that it has sufficiently large dimensions and, consequently, sufficient mechanical strength and satisfactory useful life; indeed, practice has shown that the spring in these known devices is subject to early rupture thus rendering the device inoperative and entailing time-consuming and comparatively expensive maintenance operations.

Furthermore, it is not without physical danger that the operator can act on the pawl with a view to allowing the carrying sling to pass through the gap of the hook assembly, as mentioned herein-above. Indeed, since the pawl of the known device is mounted so as to be pivotable towards its open position inside of the loop defined by the hook member, the operator must maintain a pawl within the hook member while removing the sling therefrom, which involves considerable hazard for the operator's hands.

Another known handling hook assembly distributed under the commercial name "BULTEN" comprises a hook member pivotally mounted on a bearing member adapted to be supported by the raising cable of the hoisting apparatus and forming, in a closed position, an entirely closed loop with said bearing member. The hook member is maintained in its closed position by means of a spring-loaded catch member located in the vicinity of the bearing member; with a view to bringing this known hook assembly into an open position for introducing or removing a carrying sling into the loop, the operator has to actuate manually a lever extending outwardly of the loop formed by the assembly; since this lever is located, too, in the vicinity of the bearing member. Such actuation of said lever is highly dangerous to the operator's hands. Indeed, as soon as the lever has been actuated and thus the hook member is unlocked with respect to the bearing member, the hook member will pivot under the action of gravity to open the hook assembly, in a direction such that the above-mentioned actuating lever approaches the bearing member which involves considerable risk for the operator to have his fingers caught and injured.

Furthermore, it has been noted that in both of the above-mentioned types of handling hook assemblies the assembly tends to tilt under the action of the hoisted load in such a direction that the distances between the lowermost zone of the hook member and the gap thereof decrease, which involves a risk of disengagement of the raising sling (and of the load supported by the latter) from the hook assembly.

It is an object of the present invention to provide a handling hook assembly which overcomes the drawbacks of the known devices of the kind considered herein.

More particularly, it is an object of the invention to provide a handling hook assembly which allows a carrying sling to be easily introduced into and removed from the hook member of such assembly without endangering the operator and without requiring a special actuating of the assembly.

Another object of the invention is to provide a handling hook assembly wherein the reliability of the closure of the loop formed by the closed assembly increases with the weight of the load to be hoisted.

SUMMARY OF THE INVENTION

With these and other objectives in mind, the present invention provides a handling hook assembly for a hoisting apparatus that includes a lifting cable for hoisting a load carrying sling or the like. The handling hook assembly comprises a hook member forming a loop and having a long arm, a short arm with a curved hook portion therebetween. The free ends of said respective long and short arms are spaced from one another to define therebetween a gap for permitting the introduction to and removal from the hook member of the load-carrying sling or the like. The handling hook assembly further comprises a locking lever, a pivot means for pivotally mounting said locking lever onto the long arm of said hook member and adjacent the free end thereof for movement between a locking position in which said locking lever bridges said gap and an open position wherein said gap is open and wherein said locking lever is disposed adjacent said long arm of said loop and has an aperture for receiving the lifting cable. The aperture is located, so that, when the assembly is suspended from the lifting cable above the pivot means with said curved hook member portion forming the lowermost part of the loop defined by the assembly, said pivot means is located above the lowermost zone of said loop, the direction of the lifting force from the lifting cable being offset from said pivot means and on one side thereof to impart a moment in a direction to force the end portion of said lever into said positive emgagement with the free end of said short arm of said hook member to thereby prevent the inadvertent opening of said gap during hoisting. The free end of said locking lever having a claw-shaped end portion with two claws; the claws being provided with laterally extending engaging surfaces. The short arm of said hook member is provided at its free end with laterally extending shoulder portions for engagement, respectively, by said engaging surfaces of said claws when said locking lever is in said locking position.

In one embodiment of the invention, said hooking means are constituted by a substantially nail-claw-shaped end of said locking lever and abutting shoulder portions at said free end of said short arm of the hook member and adapted to cooperate with said claw-shaped end of the locking lever when the latter is in its locking position.

According to one feature of the invention, said locking means are constituted by a hook-shaped end portion of said locking lever and a hole provided in said short arm of the hook member adjacent to said free end thereof, said hook-shaped end portion of the locking lever being adapted to engage said hole when said locking lever is in said locking position.

According to another feature of the invention, said hooking means are constituted by a substantially nail-claw-shaped end of said short arm of the hook member and abutting shoulder portions provided at the end of said locking lever and adapted to cooperate with said nail-claw-shaped end of said short arm when said locking lever is in its locking position.

In a preferred embodiment of the invention, the hook member has an elongated shape in which the distance between said pivoting axis and said lowermost zone of the curved portion is substantially larger than the distance between said respective free ends of said long and short arms and substantially larger than the distance between the free end of said short arm and the zone of said long arm which is opposite to said free end of the short arm.

In yet another embodiment of the invention, the lever member is pivotably displaceable between said locking and open positions inside the loop defined by said hook member.

In accordance with a particular feature of the present invention, the locking lever is pivotably displaceable between said locking and open positions outside of the loop defined by said hook member.

In still another embodiment of the invention, the pivoting axis is defined by a pivot mounted on the two branches of a fork-shaped portion provided at said free end of the long arm of the hook member, and wherein said locking lever comprises a flat portion engaged into the space between said two branches, said pivot being engaged into an elongated hole provided in said flat portion and being moveable in said hole between an upper position and a lower position, said hooking means provided on said locking lever and on said short arm of the hook member, respectively, being so arranged that they are positively interengaged when said pivot is in its lower position and that they are selectively engageable and disengageable when said pivot is in its upper position.

According to yet another feature of the invention, the pivoting axis is defined by a pivot mounted on the two branches of a fork-shaped portion provided at said free end of said long arm of the hook member, and wherein said locking lever comprises a flat portion engaged into an excentric hole the longest dimension of which extends substantially vertically when said hook assembly is depending from said raising cable, whereby said pivot is moveable between an upper position and a lower position, said hooking means being so arranged that they are positively interengaged when the pivot is in its upper position while said locking lever is in said locking position, whereas said hooking means are selectively engageable and disengageable with respect to each other when said pivot is in its lower position, said flat portion being provided with stop members extending perpendicularly to the plane of said flat member and protruding therefrom at both surfaces thereof, while said two branches of said fork are provided each with two angularly spaced notches to cooperate selectively with said stop members, the arrangement being such that the latter can engage each corresponding notch only when said pivot is in said upper position, whereas said stop members are not engaged in any one of said notches when said pivot is in said lower position.

In another advantageous embodiment of the invention, the hook member is provided with guiding ramps adjacent said free end of the short arm of said hook member for protecting the end of said locking lever which is provided with said hooking means against shocks when said hoisting apparatus lowers said hook assembly.

In one particular embodiment of the invention, the aperture adapted to receive said raising cable is defined in an element connected to said locking lever by a swivel block or the like.

The invention will be described herein-below in a more detailed manner with reference to the appended drawings which show by way of example, but not of limitation, various embodiments of the invention.

BRIEF DESCRIPTION OF THE DRAWINGS

FIG. 1 is an elevational view of one embodiment of the handling hook assembly according to the invention.

FIG. 2 shows, in elevation, a detail of another embodiment of the invention.

FIG. 3 is an elevational view of a modified form of the handling hook assembly according to the invention.

FIGS. 4 and 5 show in perspective one embodiment of the hooking means of the assembly shown in FIG. 1.

As shown in FIG. 1, a handling hook assembly according to the invention comprises a hook member generally indicated by reference numeral 1. The hook member comprising a comparatively long arm 1b, a curved hook portion 1f connecting the long arm 1b to a comparatively short arm 1c. The shape of the hook member is such that a gap is defined between the respective free ends of the long arm 1b and the short arm 1c. In the vicinity of its free end the long arm 1b is pivotally mounted by means of a pivot 3 on a locking lever 2. In the embodiment of FIG. 1 locking lever 2 has a flat portion 4 engaged between the two branches of a fork-shaped portion 1d provided at the free end of long arm 1b and holding the above-mentioned pivot 3, which extends through a hole provided in the flat portion 4 of the locking lever 2.

Figure 6:
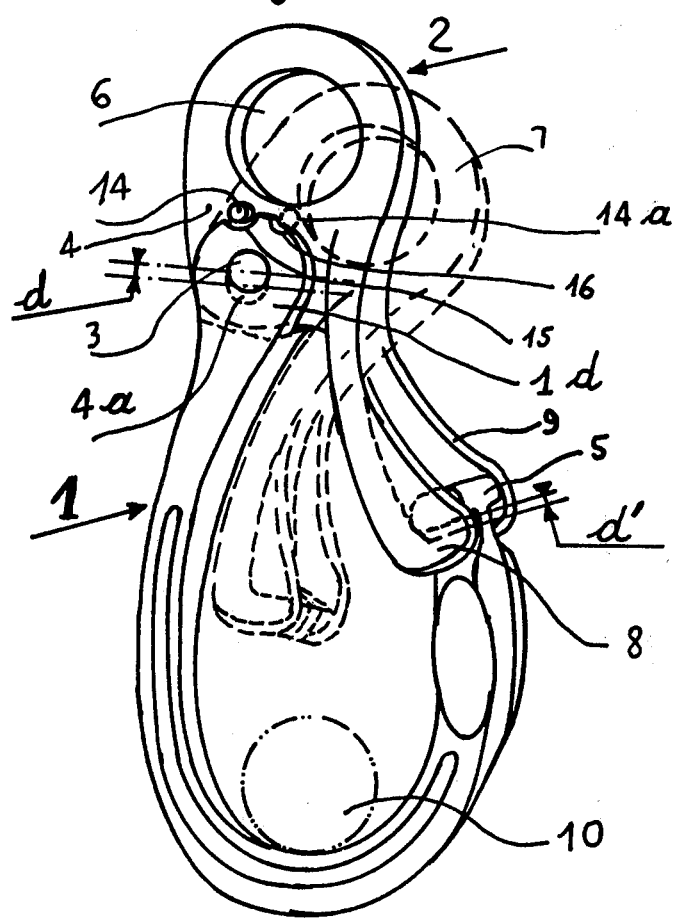
FIG. 6 is a schematic elevational view of yet another embodiment of the handling hook assembly according to the invention, comprising means for locking the locking lever and the hook member in two different relative angular positions.

In the variant shown in FIG. 2 the long arm of hook member 1 is provided at its free end with a flat portion 1a engaged between the two branches of a fork-shaped portion 2a provided on locking lever 2 and holding a pivot 3 extending through a hole provided in flat portion 1a of hook portion 1.

Locking lever 2 has at its upper end (as shown in the Figures) an aperture 6 adapted to receive a raising cable, or the like, actuated by a hoisting apparatus, such as a crane, a pulley block, tackle, etc.

In the variant shown in FIG. 3, such raising cable is adapted to be received in a lug-like member 12 connected by a swivel block 11 to the locking lever 2.

Locking lever 2 has an arm 9 having a sufficient length for closing or bridging over a gap provided between the respective free end of long arm 1b and short art 1c of hook member 1. In the embodiment shown in FIG. 4, arm 9 is provided with a nail-claw-like portion 8 engageable under a shoulder portion (illustrated in FIG. 5) provided at the free end of short arm 1c, when the handling hook assembly is in its closed position.

With a view to introducing a carrying sling 10 through the above-mentioned gap (as indicated by reference numeral 10a) into the loop formed by hook member 1, locking lever 2 can be moved from the position shown in full lines in FIG. 1 (closed position) towards the position shown in dash-dot lines at 7 in FIG. 1.

It will be easily understood that when such carrying sling carrying a load has been introduced into the hook member and when then the hoisting apparatus (not shown) via the above-mentioned raising cable (not shown) lifts the handling hook assembly, the latter will be brought automatically and positively maintained in its closed position under the action of the load applied to the assembly through carrying sling 10. This result is obtained due to the particular arrangement of the present handling hook assembly wherein, when the latter depends from a raising cable with a view to being hoisted, the aperture 6 is located at a level substantially above pivot 3 while the latter is located substantially above the lowermost zone of curved portion 1f of the hook member, which lowermost zone is submitted to the force resulting from the weight of the load attached to carrying sling 10. It will also be understood that no complicated or dangerous manipulation of the handling hook assembly is required with a view to moving the same into its opening position for introducing or removing a carrying sling such as 10, while said assembly is not under load.

In the embodiment shown in FIG. 6, which is somewhat similar to the one shown in FIGS. 1, 4 and 5, the flat portion 4 of locking lever 2, which is engaged between the two branches of the fork-like portion 1d of hook member 1, is provided with a fixed stop pin extending through said flat portion and perpendicularly thereto. The substantially circular respective upper peripheries of said two branches (only one of which is visible in the drawing) are provided with notches 15 and 16. The hole 4a provided in the flat portion 4 of locking lever 2 is either oval or oblong with its largest dimension extending substantially vertically (with reference to the drawing). Consequently, when the handling hook assembly is not under load, the locking lever 2 can be displaced downwardly over a short distance d, whereby stop pin 14 engages notch 15 when the assembly is in its closed position as shown in the full lines. Under these conditions, the respective hooking means are disengaged by a corresponding short distance d'. It will be understood that in this position stop pin 14 is engaged in notch 15 and thereby prevents any accidental relative angular motion between locking lever 2 and hook member 1. This constitutes an appreciable protection for any operator who might be called upon to handle the assembly under such conditions.

Stop pin 14 can be disengaged from notch 15, by raising locking lever 2 with respect to hook member 1, i.e. by moving pivot 3 into its lowermost position in oblong hole 4a. The assembly can then be brought into its open position shown in dash-dot lines at 7, wherein stop pin 14 is located in front of notch 16. By repeating the process described herein-above, i.e. lowering locking lever 2 with respect to hook member 1, stop pin 14, which is shown in this position in dot lines at 14a—can be brought into engagement with notch 16 and will then lock the handling hook assembly in the open position. When in this position the operator can introduce into the hook member a carrying sling 10 or to remove such sling from the hook member without running any risk of physical injury by an accidental closing of the assembly.

It will be well understood that the invention is not limited to the embodiments shown and described hereinabove. Numerous modifications may be envisaged by any person skilled in the art within the spirit and scope of the invention, such as defined in the appended claims.

What is claimed is:

1. A handle hook assembly for a hoisting apparatus that includes a lifting cable for hoisting a load-carrying sling or the like, said handling hook assembly comprising a hook member forming a loop having a long arm, a short arm with a curved hook portion therebetween, the free ends of said respective long and short arms being spaced from one another to define therebetween a gap for permitting the introduction into and removal from the hook member of the load-carrying sling or the like, said handling hook assembly further comprising a locking lever, pivot means for pivotally mounting said locking lever onto the long arm of said hook member and adjacent the free end thereof for movement between a locking position in which said locking lever bridges said gap and an open position wherein said gap is open and wherein said locking lever is disposed adjacent said long arm of said loop, said locking lever having an aperture for receiving the lifting cable, said aperture being located so that, when the assembly is suspended from the lifting cable above the pivot means with said curved hook member portion forming the lowermost part of the loop defined by the assembly, said pivot means is located above the lowermost zone of said loop, the direction of the lifting force from the lifting cable being offset from said pivot means and on one side thereof to impart thereto a moment in a direction to force the end portion of said lever into positive engagement with the free end of said short arm of said hook member to prevent inadvertent opening of said gap during hoisting, the free end of said locking lever having a claw-shaped end portion with two claws, said claws being provided with laterally extending engaging surfaces, said short arm of said hook member being provided at its free end with laterally extending shoulder portions for engagement, respectively, by said engaging surfaces of said claws when said locking lever is in said locking position.

2. The handling hook assembly of claim 1, wherein said long arm of said hook has two laterally spaced branches at its free end, and wherein said pivot means comprises a pivot pin extending between said two laterally spaced branches, said locking lever having a flat portion with an eccentrically shaped hole provided therein, said flat portion of said locking lever being disposed between said two laterally spaced branches with the pivot pin extending through said eccentric hole, the eccentricity of said hole being such that the longer dimension thereof extends substantially vertically when said hook assembly depends from said raising cable, whereby said pivot is relatively moveable within said eccentric hole between an upper position and a lower position, stop members extending laterally from both surfaces of said flat portion of said locking lever, a pair of complementary angularly spaced stop member on each of said spaced branches for cooperating with said stop members on said flat portion so that when said pivot is in said upper relative position within said eccentric hole, said cooperating stop member cooperates to hold said locking lever fixed relative to said hook member and when said pivot is in said relative lower position said stop members do not so cooperate.

3. The handling hook assembly of claim 1, wherein said hook member is provided with guiding ramps adjacent said free end of the short arm thereof, for protecting the end of said locking lever against shocks while said hoisting apparatus lowers said hook assembly.

4. The handling hook assembly of claim 2, wherein said hook member is provided with guiding ramps adjacent said free end of the short arm thereof, for protecting the end of said locking lever against shocks while said hoisting apparatus lowers said hook assembly.

5. The handling hook assembly of claim 1, wherein said aperture adapted to receive said raising cable is provided in an element connected to said locking lever by a swivel block.

6. The handling hook assembly of claim 2, wherein said aperture adapted to receive said raising cable is provided in an element connected to said locking lever by a swivel block.

7. The handling hook assembly of claim 3, wherein said aperture adapted to receive said raising cable is provided in an element connected to said locking lever by a swivel block.

8. The handling hook assembly of claim 5, wherein said aperture adapted to receive said raising cable is provided in an element connected to said locking lever by a swivel block.

* * * * *